United States Patent
Shinoda et al.

[11] 3,901,949
[45] Aug. 26, 1975

[54] PROCESS FOR THE MANUFACTURE OF VINYLIDENE CHLORIDE AND/OR METHYLCHLOROFORM

[75] Inventors: Kiyonori Shinoda; Tadashi Nakamura; Masayuki Funabashi; Azuma Okubo, all of Iwaki, Japan

[73] Assignee: Kureha Kagaku Kogyo K.K., Tokyo, Japan

[22] Filed: June 15, 1973

[21] Appl. No.: 370,570

Related U.S. Application Data

[63] Continuation of Ser. No. 106,421, Jan. 14, 1971, abandoned.

[30] Foreign Application Priority Data

Jan. 14, 1970 Japan............ 45-4152
Jan. 14, 1970 Japan............ 45-4153
July 15, 1970 Japan............ 45-61941

[52] U.S. Cl....... 260/654 H; 260/656 R; 260/658 R
[51] Int. Cl. ........................................ C07c 21/08
[58] Field of Search......... 260/658 R, 654 H, 654 D

[56] References Cited
UNITED STATES PATENTS

| | | | |
|---|---|---|---|
| 2,547,139 | 4/1951 | Randall............... | 260/658 R |
| 2,628,259 | 2/1953 | Dirstine et al......... | 260/654 H |
| 3,012,081 | 12/1961 | Conrad et al.......... | 260/658 R |
| 3,029,299 | 4/1962 | Thermet et al......... | 260/654 H |
| 3,059,035 | 10/1962 | Benner et al.......... | 260/658 R |
| 3,115,529 | 12/1963 | Lindsay.............. | 260/658 R |
| 3,304,337 | 2/1967 | Jordan et al.......... | 260/658 R |

Primary Examiner—Delbert E. Gantz
Assistant Examiner—Joseph A. Boska
Attorney, Agent, or Firm—Sughrue, Rothwell, Mion, Zinn and Macpeak

[57] ABSTRACT

A process for the manufacture of vinylidene chloride and methylchloroform which comprises a first step of mutually reacting vinyl chloride and hydrogen chloride in order to produce ethylidene chloride; a second step of reacting the ethylidene chloride thus produced with chlorine at an elevated temperature; and a third step of removing the products formed in the foregoing second step from the reaction system, said hydrogen chloride and vinyl chloride produced in the second step being returned to the first step for re-circulation, thereby providing vinylidene chloride and methylchloroform.

2 Claims, 1 Drawing Figure

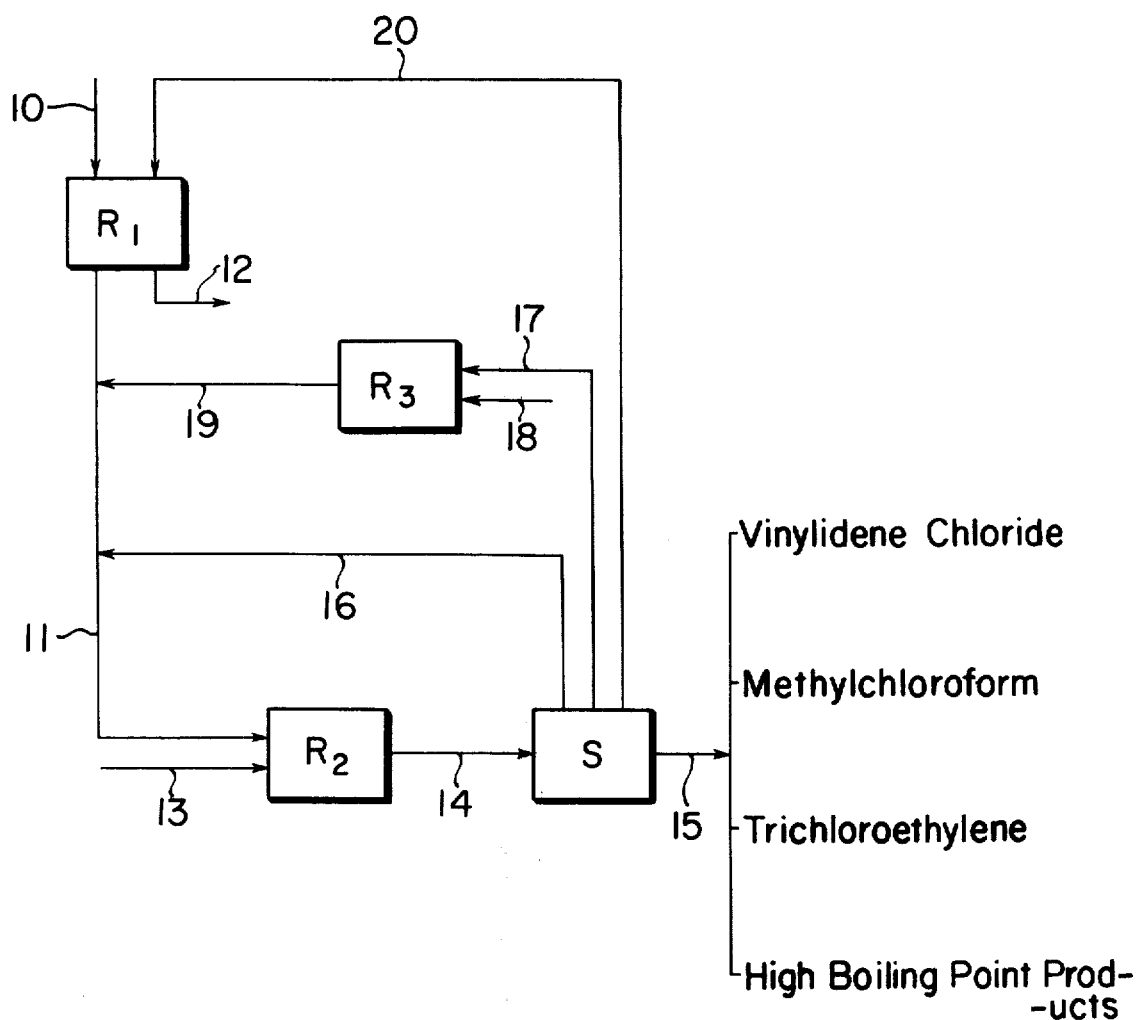

PROCESS FOR THE MANUFACTURE OF VINYLIDENE CHLORIDE AND/OR METHYLCHLOROFORM

This is a continuation of application Ser. No. 106,421 filed Jan. 14, 1971 now abandoned.

This invention relates generally to a process for the manufacture of vinylidene chloride and methylchloroform. More specifically, it relates to the process for the manufacture of chlorinated hydrocarbons starting from vinyl chloride and chlorine, the group of said chlorinated hydrocarbons including vinylidene chloride as a main or central compound. Still more specifically, it relates to such a manufacturing process wherein vinyl chloride and hydrogen chloride are processed to ethylidene chloride which is then thermally chlorinated to vinylidene chloride and methylchloroform, and when desired, and trichloroethylene.

The industrial demand of vinylidene chloride monomer has been recently increased rather surprisingly by reason of the useful superior and specific properties of its polymers and copolymers. On the other hand, a broad demand of methylchloroform and trichloroethylene is seen even now, on account of their industrial usage as inflamable solvent and cleaning agent.

Various proposals have hitherto been made for the manufacture of vinylidene chloride. When seen industrially, such process has almost exclusively employed that 1,1,2-trichloroethane is subjected to dehydrochlorination in the presence of alkali. In practice of this conventional process, while the yield of vinylidene chloride is high, the consumption rate of hydrogen chloride and alkali is very high which constitutes a rather substantial drawback in economy. On the other hand, it has been already proposed to carry out the above process, indeed, in the absence of alkali and through the way of thermal decomposition of 1,1,2-trichloroethane. In this processing mode, however, a large amount of 1,2-dichloroethylene as a disadvantageous by-product is produced, thereby an industrial application of this process being substantially absolutely prevented.

It is therefore the main object of the present invention to provide an improved process for the manufacture of vinylidene chloride and methylchloroform in an easy and economical way without inviting aforementioned various conventional drawbacks.

In order to fulfil the above and further objects which will become clearer as the description proceeds, the process according to this invention comprises in combination of a first step for bringing vinyl chloride and hydrogen chloride into mutual reaction to ethylidene chloride; a second step for bringing the thus obtained ethylidene chloride into reaction with chlorine at an elevated temperature and a third step for removal of the products formed in the foregoing second step from the reaction system, hydrogen chloride and vinyl chloride formed in the second step being returned to the first step for recirculation, thereby providing vinylidene chloride and methylchloroform.

In the process proposed by the present invention, it is believed that the vinylidene chloride is formed by dehydro-chlorination of methylchloroform. It should be stressed, however, that methylchloroform alone is thermally decomposed, the reaction velocity is highly low and a substantially elevated temperature is necessary to adopt for obtaining a satisfying conversion rate, inviting disadvantageously, however, a substantial decrease in the yield of the desired products caused by unavoidable carbonization. It has been found, however that when a small amount of chlorine is added to the reaction system, the conversion rate to vinylidene chloride can be amazingly increased. As an example and as ascertained by our practical experiment, when methylchloroform is thermally decomposed at 450°C for about 3 seconds in a conventional flow system, the yield of vinylidene chloride amounts only to 4 mole % or so. On the contrary, an addition of chlorine only in the rate of 0.5 mole % to the system, the yield of vinylidene chloride can be increased to as high as 31.5 mole %, as an example (refer to Reference Example 3 to be described).

On the one hand, methylchloroform can be prepared through chlorination of ethylidene chloride. In the case of the photoreaction in liquid phase conventionally employed for the chlorination, while the selectivity to methylchloroform can be improved to a certain degree by modifying the light wave length and properly selecting the kind of solvent, the formation of the by-products such as 1,1,2-trichloroethane and other polychlorocompounds can not be avoided and the reaction velocity is unacceptably low.

Various studies have hitherto been made in the gas phase, thermal chlorination of ethylidene chloride and, indeed, almost all being directed for the purpose of manufacture of methylchloroform. In these prior techniques, thermal chlorination of ethylidene chloride is carried into effect at a relatively low temperature such as 400°C or so. Even if the reaction temperature is selected at a higher value, the residence period is set to a substantially short one, the conversion rate being thus of correspondingly low value.

In the progress of thermal chlorination of ethylidene chloride, both kinds of reaction, i.e. substituting chlorination and dehydrochlorination are simultaneously invited at first. By the substituting chlorination, there is a possibility of forming 1,1,2-trichloroethane, in addition to the desired formation of methylchloroform. The methylchloroform will provide 1,1,1,2-tetrachloroethane by successive chlorination, in addition to the regular formation of vinylidene chloride through dehydrochlorination. On the other hand, 1,1,2-trichloroethane will provide vinylidene chloride and two kinds of 1,2-dichloroethylene through dehydrochlorination, and two kinds of tetrachloroethane through chlorination. From tetrachloroethane, trichloroethane will be provided through the way of dehydrochlorination. On the other hand, ethylidene chloride will provide vinyl chloride through dehydrochrorination. All these reactions may be expressed schematically in the following way:

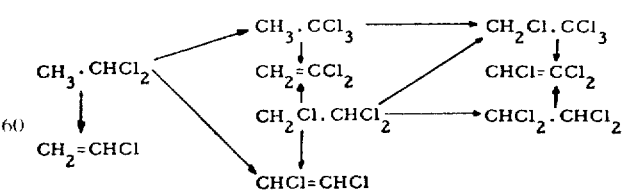

The reaction velocity of the substituting chlorination is such as: $CH_3.CHCl_2 > CH_3.CCl_3$ which is favorable in a least possible formation of tetrachloroethane and trichloroethylene and in a largest possible formation of methylchloroform and the dehydrochlorination product therefrom or vinylidene chloride. With the molar ratio of chlorine/ethylidene chloride 0.8 or less as measured at the initial supply period of the starting materials, the overall yield of the formed main products: vinyl chloride, vinylidene chloride and methylchloroform will generally be in the order of 90 mole %. With the molar ratio larger than 0.8, on the contrary, the formed quantities of tetrachloroethane, trichloroethylene and 1,2-dichloroethylene will gradually increase. It is therefore highly advantageous to carry out the reaction with relatively small molar ratio of chlorine/ethylidene chloride, when the formation of trichloroethylene is avoided as far as possible. When, in this case, the reaction is carried out at a rather lower temperature such as 350°C or so, the formed quantity of 1,1,2-trichloroethane will increase, while that of the desired products will decrease. As an example, when the reaction temperature amounts to about 400°C, 1,1,2-trichloroethane will reduce and the substitutingly chrorinated products are predominantly occupied by methylchloroform, and further, the formation of vinyl chloride through the dehydrochlorination of ethylidenechloride will increase. With the reaction temperature higher than 450°C, the dehydrochlorinating reaction will become rather apparent and the formed quantity of vinylidene chloride will increase, while that of methylchloroform will decrease correspondingly. With the reaction temperature still further elevated to 500°C or higher, the dehydrochrinating reaction becomes still more active and the saturatedly chlorinated hydrocarbons will be almost dehydrochlorinated mainly to vinyl chloride and vinylidene chloride. When the reaction temperature is still further elevated, the disadvantageous carburization occurs and the desired yield will be decreased substantially. From these reasons, the operational temperature to be adopted in practice of the invention should preferably be between about 450° and about 500°C.

As was referred briefly to hereinbefore, the vinylidene chloride is believed to form in the progress of the inventive process, through the way of methylchloroform. On the other hand, it is observed that there remains in the reactor a certain residual amount of non-reacted chlorine in the case of formation of methylchloroform through thermal chlorination of ethylidene chloride, and the residual chlorine may act as a catalyst for accelerating the dehydrochlorinating reaction when the reaction temperature is high enough to allow it. On the other hand, it is observed that the residual chlorine will gradually reduce in its concentration as being consumed in the substitutingly chrorinating reaction. With the reaction temperature controlled to less than about 450°C, a presence of the residual chlorine will affect in practically any way upon the dehydrochlorinating reaction which proceeds thus at a neglectably slow speed, resulting in only a small amount of formed vinylidene chloride.

With higher operational temperatures than above specified, non-reacted residual chlorine acts effectively as the catalyser for the dehydrochlorinating reaction. It should be noted that a characterizing feature of the invention is such that in practice of the process, the formation of methylchloroform through thermal chlorination of ethylidene chloride and the dehydrochlorinating reaction of methylchloroform are carried into effect simultaneously in one and the same reaction vessel.

With increase of chlorine supply ratio to ethylidene chloride, the amounts of non-reacted ethylidene chloride and formed vinyl chloride will be reduced, while the amount of formed methylchloroform will be increased. With the supply molar ratio set to 0.7–0.8, the formed amount of mehtylchloroform will initiate to decrease and instead, the formed amounts of chlorinated ethylenes such as vinylidene chloride, trichloroethylene and the like compounds will become appreciable. The reason for the increased amount of formed vinylidene chloride resides in such that the chlorine existing in the reaction system acts to accelerate the dehydrochlorination of methylchloroform, the trichloroethylene being formed by such that methylchloroform is converted to tetrachloroethane in a successive order as referred to hereinabove and the tetrachloroethane is subjected quickly to dehydrochlorination to trichloroethylene. Based upon the above observation, and in the process according to this invention adapted for obtaining vinylidene chloride as its main product, the supply molar ratio of chlorine/ethylidene chloride should preferably be adjusted to 0.6–1.0. With the molar ratio set to less than 0.6, the amount of non-reacted ethylidene chloride will be unacceptably large and the yield of the required vinylidene chloride is rather low.

Since, as was referred to hereinbefore, the chlorinating reaction and the dehydrochlorinating reaction are invited in a successive order, the forming ratio between methylchloroform and vinylidene chloride may be modified by adjusting the residual period of the reaction mixture in the reactor.

According to our experimental results under the above specified operational conditions, maximum value of the molar ratio of formed vinylidene chloride and methylchloroform amounts to 5 : 1 or so, and these reaction conditions may be insufficient to carry out the process, when the manufacture of mehtylchloroform is not desired.

In order to reduce as possible the formation of methylchloroform, there are two ways: One is to increase the reaction temperature; and the other is to increase the supply ratio of chlorine. With the first measure when employed, for instance, to set it at about 550°C, a certain amount of formed methylchloroform can not be avoided, and in addition, a formation of tarry substances and deposit of carbon may frequently be encountered on account of the higher operational temperature thus adopted. With the latter measure when employed, on the other hand, an increased formation of higher chlorinated substances and a correspondingly decreased yield of the desired product may frequently be encountered.

It is proposed to avoid the aforementioned technical difficulties, we propose for the case of thermal chlorination of ethylidene chloride a recirculation of the formed methylchloroform again through the reaction system. According to our experimental results, the disadvantageous formation of methylchloroform can be suppressed practically to nil by adopting the above mentioned recirculation measure. It should be noted that by adopting this measure, the forming ratio of mehtylchloroform can be adjusted, indeed, without substantial modification of the reaction conditions.

The co-existance of methylchloroform in the thermal chlorination step will provide such processing advantage that the developed heat in the chlorinating reaction of ethylidene chloride will be substantially absorbed in a cancelling manner in and by the dehydrochlorinating reaction of methylchloroform. In this way, the adjustment of the reaction temperature may be made highly easier and simpler. By the presence of chlorine, the desired dehydrochlorinating reaction will progress in a highly easy way and substantially all the recirculated methylchloroform can be converted to vinylidene chloride.

With use of the recirculation technique in the above sense, the simultaneous production of vinylidene chloride and methylchloroform can be performed under rather gentle operating conditions, and when desired, the control of production rate between the both may be made in a more easy and positive way. An exclusive production of vinylidene chloride only may be substantially realized. A reduction of carbon yield will, however, be invited to a certain degree when adopting such recirculation technique.

In the case of the manufacture of vinylidene chloride and methylchloroform in the above mentioned manner, the combined yield of both or more specifically [(vinylidene chloride plus methylchloroform minus recirculated methylchloroform)/(supplied ethylidene chloride minus vinyl chloride)] will amount generally to about 85 molar %. Main by-products and the like are: 1,2-dichloroethylene; non-reacted ethylidene chloride; trichloroethylene; 1,1,2-trichloroethane; tetrachloroethane. The overall amount of these by-products will amount generally to about 15% of the products excluding vinyl chloride, which amount can not be neglected in practice if these by-products not be utilized for useful purposes.

In order to minimize as possible the discarded chlorinated hydrocarbons, it is further proposed by the present invention to recirculate part of these by-products through the thermally chlorination reactor for conversion into trichloroethylene.

Since the boiling point of the non-reacted ethylidene chloride is situated between those of trans-1,2-dichloroethylene and cis-1,2-dichloroethylene, a distillative separation is very difficult to adopt. More specifically, for performing the above kind separation, there must be provided two distillation towers. The difficulty arises further from the fact that the boiling point of the non-reacted ethylidene chloride is very close to that of cis-1,2-dichloroethylene.

On the other hand, it has been observed that 1,2-dichloroethylene is almost inactive under the operating conditions for the thermally chlorinating reaction as proposed by the present invention so that it may accumulate within the reaction system when it is returned thereto for recirculation.

It has been favorably found, however, that when the mixture of ethylidene chloride and 1,2-dichloroethylene is subjected to chlorination in liquid phase and at a low temperature, ethylidene chloride is practically not affected in the converting direction, while 1,2-dichloroethylene only is converted easily to tetrachloroethane. The thus formed mixture of ethylidene chloride and tetrachloroethane can be recirculated through the thermally chlorinating reactor wherein trichloroethylene is formed from tetrachloroethane. 1,1,2-trichloroethane and tetrachloroethane contained in the by-products may be, when necessary, recirculated as per se through the reactor, so as to convert finally almost all amount of the both to trichloroethylene. When trichloroethylene is simultaneously prepared in the above mentioned way, the overall yield of vinylidene chloride, methylchloroform and trichloroethylene will generally amount to 95% or higher.

It has also been ascertained from our practical experiments that the yield of the main useful products can not decrease even by selecting the supply ratio : chloride/ethylidene chloride to a maximum value : 1.0. It should be, however, stressed that the manufacture of trichloroethylene has the object for reducing as possible the discarding amount of undesirous and useless by-products. It is therefore recommended not to try to manufacture of trichloroethylene as the main product in the aforementioned processing mode.

The ethylidene chloride to be used as the feed material for carrying out the thermally chlorinating reaction can be prepared with a high yield by reacting vinyl chloride and hydrogen chloride in a liquid phase and in the presence of ferric chloride as catalyst. Vinyl chloride formed by the thermally chlorinating step may be recirculated through the above reaction system for conversion back to ethylidene chloride.

The amount of hydrogen chloride is generally sufficient for carrying out the reaction when using that through the thermal chlorination step. The reaction temperature may be 30°–60°C. The amount of the catalyst may preferably and generally amount to 1–5 g per lit. of solvent ethylidene chloride. The necessary quantity of the catalyst depends upon the aqueous content in the liquid phase. If the aqueous content is less than 100 ppm. 1 kg of ethylidene chloride can be formed for 1 g of ferric chloride catalyst. The reaction pressure is the higher, the results will be better so far.

A schematic representation of the process according to this invention is shown on the accompanying drawing.

In this figure, the starting material : vinyl chloride is fed from inlet at 10 to a first reactor $R_1$, while a mixture of vinyl chloride and hydrogen chloride supplied from a piping 20 and in the form of the products from a thermally chlorinating reaction is also supplied to the same reactor $R_1$, said vinyl chloride being subjected to a hydrogen chloride-addition to ethylidene chloride. Excess non-reacted hydrogen chloride is discharged from the reaction system through an outlet piping 12.

The thus formed ethylidene chloride is separated off from catalyst and conveyed through a piping 11 to a second reactor $R_2$ for thermal chlorination. Chlorine is fed to the same reactor $R_2$ through a supply pipe 13. Through a piping 16 from the stage S, a mixture of trichloroethanes and tetrachloroethanes are supplied, when necessary, to the same reactor $R_2$. Non-reacted ethylidene chloride and formed 1,1,2,2 tetrachloroethane are fed from a third reactor $R_3$ through a piping 19 to the second reactor $R_2$ for performing the thermally chlorinating reaction. The products are fed from reactor $R_2$ through a piping 14 to the vessel S for being subjected therein to fractional distillation to separate into constituents. Among others, hydrogen chloride and vinyl chloride are returned from the vessel S through piping 20 to the first reactor $R_1$. Vinylidene chloride, methylchloroform, trichloroethylene and high boiling point products are taken out from the reaction system through an outlet piping 15. 1,2 Dichloroethylene fraction containing non-reacted ethylidene chloride is subjected in third reactor $R_3$ to chlorination by chlorine fed through an inlet piping 18. The dichloroethylene is thus converted to 1,1,2,2 tetrachloroethane which is then fed from the reactor $R_3$ through piping 19 to the second reactor $R_2$, as was referred to above. Through the piping 16, trichloroethanes and tetrachloroethanes are returned to the second reactor $R_2$ when necessary for recirculation.

EXAMPLE

As shown schematically on the accompanying drawing and described so far, vinyl chloride and chlorine were used as starting materials for the preparation of vinylidene, methylchloroform and trichloroethylene.

Starting material vinyl chloride, 497 wt. parts, was subjected to a thermal chlorination step in the first reactor $R_1$ by mixing with hydrogen chloride 624 wt. parts and vinyl chloride 128 parts which are recirculated from the thermal chlorination stage, so as to form and provide ethylidene chloride, 980 wt. parts. About 1% of the charged vinyl chloride remained as non-reacted residual. Excess hydrogen chloride was discharged to outside from the reaction system through discharge piping 12.

The reaction temperature in the reactor $R_1$ was set to about 50°C and the catalyst was anhydrous ferrichloride. In this way, 800–1,000 g of ethylidene chloride were obtained per 1 g of the catalyst.

The ethylidene chloride was brought into a mixture with 78 wt. parts of 1,1,2,2-tetrachloroethane and 10 wt. parts of ethylidene chloride supplied in the form of a mixture recirculated through the third reactor $R_3$ to the second reactor $R_2$, so as to react therein with 607 wt. parts of chlorine.

The thermal chlorinating reaction was performed at 480°C and 5 kg/cm²G. The products consist of 635 wt. parts of hydrogen chloride, 128 wt. parts of vinyl chloride, 538 wt. parts of vinylidene chloride, 45 wt. parts of 1,2-dichloroethylene, 10 wt. parts of ethylidene chloride, 179 wt. parts of methylchloroform, 112 wt. parts of trichloroethylene and 34 wt. parts of other high boiling point products, of which, hydrogen chloride and vinyl chloride were returned to the first reactor $R_1$ for recirculation.

1,2-dichloroethylene and non-reacted ethylidene chloride were separated in the same distillated fraction and fed to the third reactor $R_3$ wherein they were subjected to a chlorine-addition by 33 wt. parts of chlorine to convert the dichloroethylene to tetrachloroethane. This reaction was carried out at room temperature under normal pressure and in the presence of the catalyst of anhydrous ferrichloride in an easy way, so as to provide 78 wt. parts of tetrachloroethane.

Other products were distilled off from the reaction system.

REFERENCE EXAMPLE 1

A comparative reaction was performed in the mode of a flow system with use of a tubular reaction vessel, made of "Pylex"—glass, 30 cm long, having an inside volume 37.65 ml and heated from outside. The reaction temperature was 480°C.

Ethylidene chloride, 0.431 mole per hr. and chlorine, 0.323 mole per hr., preheated to about 180°C, were mixed together and fed to the tubular reactor for reaction.

Upon attainment of the reaction to its stabilized state, the reaction gases were condensed and liquefied and then analysed by gas chromatography. The composition (mole %) was:

| | |
|---|---|
| vinyl chloride | 26.8; |
| vinylidene chloride | 36.8; |
| 1,2-dichloroethylene | 3.9; |
| ethylidene chloride | 1.2; |
| methylchloroform | 28.4; |
| trichloroethylene | 1.7; |
| 1,1,2-trichloroethane | 0.3; |
| tetrachloroethane | 0.6; |
| others | 0.2. |

REFERENCE EXAMPLE 2

The reactor was same as that used in the foregoing Ref. Ex. 1. Reaction temperature was adjusted to 480°C. Ethylidene chloride and chlorine were fed at 0.431 mole/hr. and 0.388 moles/hr., respectively. After stabilized reaction, the following products were observed:

| | |
|---|---|
| vinyl chloride | 18.7; |
| vinylidene chloride | 56.8; |
| 1,2-dichloroethylene | 5.6; |
| ethylidene chloride | 0.0; |
| methylchloroform | 13.9; |
| trichloroethylene | 4.0; |
| 1,1,2-trichloroethane | 0.1; |
| tetrachloroethane | 0.9. |

REFERENCE EXAMPLE 3

With use of the same reactor as before and at a temperature of 480°C, a similar reaction was performed under supply of ethylidene chloride 0.377 mole/hr., 1,1,2,2-tetrachloroethane 0.0419 mole/hr., and chlorine 0.339 mole/hr. The composition of the resulted reaction mixture was:

| | |
|---|---|
| vinyl chloride | 17.2; |
| vinylidene chloride | 51.6; |
| 1,2-dichloroethylene | 5.3; |
| ethylidene chloride | 0; |
| methylchloroform | 8.3; |
| trichloroethylene | 16.5; |
| 1,1,2-trichloroethane | 0.3; |
| tetrachloroethane | 0.8. |

The embodiment of the invention in which an exclusive property or privilege is claimed are as follows:

1. A process for the simultaneous manufacture of vinylidene chloride and methylchloroform comprising:
   1. reacting in the liquid phase vinyl chloride with hydrogen chloride to form a reaction product containing ethylidene chloride;
   2. thermally chlorinating at a temperature between 450° to 500°C said ethylidene chloride obtained in step (1) and the reaction product mixture containing ethylidene chloride and 1,1,2,2-tetrachloroethane produced in step (4) and fed from step (5) in the presence of from 0.6 to 1.0 mol of chlorine per mol of ethylidene chloride to form a reaction product mixture containing vinylidene chloride and methylchloroform;
   3. distilling said reaction product mixture of step (2) to obtain said vinylidene chloride, to obtain said methyl chloroform, to produce a stream comprising trichloroethylene, a stream containing a mixture of vinyl chloride and hydrogen chloride, a stream containing a mixture of 1,2-dichloroethylene and unreacted ethylidene chloride, and a stream containing a mixture of 1,1,2- trichloroethane, tetrachloroethane, and other high boiling point products;

4. reacting in the liquid phase at a low temperature or room temperature said mixture of 1,2-dichloroethylene and ethylidene chloride as produced in step (3) with chlorine to obtain a chlorinated reaction product mixture containing unreacted ethylidene chloride and 1,1,2,2-tetrachloroethane formed by the chlorination of said 1.2-dichloroethylene; and 5. recycling said stream containing hydrogen chloride and vinyl chloride as produced in step (3) to step (1) and feeding the reaction product mixture containing ethylidene chloride and 1,1,2,2-tetrachloroethane as obtained in step (4) to step (2).

2. A process for the simultaneous manufacture of vinylidene chloride and methylchloroform comprising:

1. reacting in the liquid phase vinyl chloride with hydrogen chloride to form a reaction product containing ethylidene chloride;

2. thermally chlorinating at a temperature between 450° to 500°C said ethylidene chloride obtained in step (1) together with the reaction product mixture containing ethylidene chloride and 1,1,2,2-tetrachloroethane as obtained in step (4) and fed from step (5) and methylchloroform recycled from step (5) in the presence of from 0.6 to 1.0 mol of chlorine per mol of ethylidene chloride to form a reaction product mixture containing vinylidene chloride and methylchloroform;

3. distilling said reaction product mixture of step (2) to obtain said vinylidene chloride, to obtain said methyl chloroform, to produce a stream comprising trichloroethylene, a stream containing a mixture of vinyl chloride and hydrogen chloride, a stream containing a mixture of 1,2-dichloroethylene and unreacted ethylidene chloride, and a stream containing a mixture of 1,1,2-trichloroethane, tetrachloroethane, and other high boiling point products;

4. Reacting in the liquid phase at a low temperature or room temperature said mixture of 1,2-dichloroethylene and ethylidene chloride as produced in step (3) with chlorine to obtain a chlorinated reaction product mixture containing unreacted ethylidene chloride and 1,1,2,2-tetrachloroethane formed by the chlorination of said 1,2-dichloroethylene; and 5. recycling said stream containing hydrogen chloride and vinyl chloride produced in step (3) to step (1), recycling a part of the methylchloroform obtained in step (3) to step (2) and feeding the reaction product mixture containing ethylidene chloride and 1,1,2,2-tetrachloroethane as obtained in step (4) to step (2).

* * * * *